United States Patent
Lee (10) Patent No.: US 11,570,327 B2
(45) Date of Patent: Jan. 31, 2023

(54) SCANNER CAPABLE OF FLATBED TYPE SCANNING WITH IMAGE READING UNIT DISPOSED IN UPPER UNIT

(71) Applicant: Hewlett-Packard Development Company, L.P., Spring, TX (US)

(72) Inventor: Junghoon Lee, Suwon (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/312,131

(22) PCT Filed: Jan. 21, 2020

(86) PCT No.: PCT/US2020/014399
§ 371 (c)(1),
(2) Date: Jun. 9, 2021

(87) PCT Pub. No.: WO2020/190365
PCT Pub. Date: Sep. 24, 2020

(65) Prior Publication Data
US 2022/0046139 A1     Feb. 10, 2022

(30) Foreign Application Priority Data

Mar. 21, 2019  (KR) ........................ 10-2019-0032083

(51) Int. Cl.
*H04N 1/04*     (2006.01)
*H04N 1/12*     (2006.01)
(Continued)

(52) U.S. Cl.
CPC ....... *H04N 1/1235* (2013.01); *H04N 1/00631* (2013.01); *H04N 1/028* (2013.01);
(Continued)

(58) Field of Classification Search
CPC .. H04N 1/1235; H04N 1/00631; H04N 1/028; H04N 1/10; H04N 1/123; H04N 2201/0081
See application file for complete search history.

(56) References Cited

U.S. PATENT DOCUMENTS 5,583,607 A * 12/1996 Fujioka ................ H04N 1/1052
355/75
6,438,350 B1 * 8/2002 Hasegawa .......... H04N 1/00572
399/374
(Continued)

FOREIGN PATENT DOCUMENTS

JP     20050194017 A     7/2005
JP     2006245927 A     9/2006
(Continued)

*Primary Examiner* — Cheukfan Lee
(74) *Attorney, Agent, or Firm* — Brooks, Cameron & Huebsch, PLLC (57) ABSTRACT

A scanner includes a lower unit and an upper unit. The lower unit includes a first document table on which a first document is to be placed. The upper unit includes a second document table on which a second document is to be loaded and a document feed path through which the second document is to be picked up from the second document table fed, the upper unit being coupled to the lower unit to pivot between a closed position in which the first document table is covered and an open position in which the first document table is exposed. The upper unit further includes a reading unit to read an image from the first document and the second document by performing flatbed scanning on the first document and document feed scanning on the second document.

16 Claims, 6 Drawing Sheets

(51) Int. Cl.
*H04N 1/00* (2006.01)
*H04N 1/028* (2006.01)
*H04N 1/10* (2006.01)

(52) U.S. Cl.
CPC ............... *H04N 1/10* (2013.01); *H04N 1/123* (2013.01); *H04N 2201/0081* (2013.01)

(56) References Cited

U.S. PATENT DOCUMENTS

| | | | | |
|---|---|---|---|---|
| 6,809,842 | B1* | 10/2004 | Tsai | H04N 1/1013 382/312 |
| 7,397,586 | B2* | 7/2008 | Panini | G06Q 20/00 358/496 |
| 8,351,807 | B2 | 1/2013 | Seki | |
| 8,687,249 | B1* | 4/2014 | Liu | H04N 1/12 250/234 |
| 8,736,928 | B2* | 5/2014 | Tsai | H04N 1/121 358/496 |
| 8,861,043 | B2* | 10/2014 | Lee | H04N 1/3263 358/504 |
| 9,411,293 | B2* | 8/2016 | Nakajima | G03G 15/6529 |
| 2003/0038989 | A1 | 2/2003 | Yokota et al. | |
| 2004/0252355 | A1 | 12/2004 | Chen | |
| 2007/0064285 | A1 | 3/2007 | Kohara | |
| 2007/0069451 | A1 | 3/2007 | Iwago et al. | |
| 2007/0154248 | A1* | 7/2007 | Chen | H04N 1/00602 399/374 |
| 2007/0236756 | A1 | 10/2007 | Yamaguchi | |
| 2009/0237753 | A1* | 9/2009 | Lin | H04N 1/00525 358/498 |
| 2009/0279149 | A1* | 11/2009 | Chen | H04N 1/00596 358/498 |
| 2014/0092448 | A1* | 4/2014 | Tsai | H04N 1/121 358/498 |
| 2014/0320941 | A1* | 10/2014 | Ino | H04N 1/0058 358/498 |
| 2016/0191719 | A1 | 6/2016 | Tokuyama et al. | |
| 2017/0070619 | A1 | 3/2017 | Hamada et al. | |

FOREIGN PATENT DOCUMENTS

| | | |
|---|---|---|
| JP | 20120001329 A | 9/2006 |
| JP | 20080148025 A | 6/2008 |
| KR | 100421405 B1 | 3/2004 |

* cited by examiner

SCANNER CAPABLE OF FLATBED TYPE SCANNING WITH IMAGE READING UNIT DISPOSED IN UPPER UNIT

BACKGROUND

A scanner is a device which irradiates light to a document, receives reflected light, and reads an image recorded on the document. A scanner may be used alone, or may be used in combination with a printer to print an image on a print medium.

Examples of a scanner include a flatbed scanner in which a document is located at a fixed position and a reading member moves in a sub-scanning direction to read an image, a document feed scanner in which an image is read from a document fed in a sub-scanning direction by using a reading member located at a fixed position, and a combination scanner.

In flatbed scanning of a combination scanner, a document is placed on a platen glass and a reading member located under the platen glass reads an image from the document while moving in a sub-scanning direction. In document feed scanning of the combination scanner, a document is placed on a document table located over the platen glass and a document feeder picks up the document one by one from the document table and feeds the document along a document feed path. The reading member located under the platen glass reads an image from the document fed along the document feed path at a fixed position.

Document feed scanning is used to quickly scan many documents. Flatbed scanning may be selected when a state of a document to be scanned is not suitable for document feed scanning. Flatbed scanning may be applied to, for example, a document having a size or a thickness not guaranteed by a document feed structure, a document having an image (e.g., an image drawn by pencil) that may be easily erased by friction, a document (e.g., a high-gloss document) that has little friction or is easily scratched, a photo document, a crumpled document, or a document fixed with a clip or a stapler.

DETAILED DESCRIPTION

The disclosure will now be described more fully with reference to the accompanying drawings, in which examples of the disclosure are shown. In the specification and the drawings, elements having substantially the same functions and configurations are denoted by the same reference numerals and thus a repeated explanation thereof will not be given.

Figure 1:
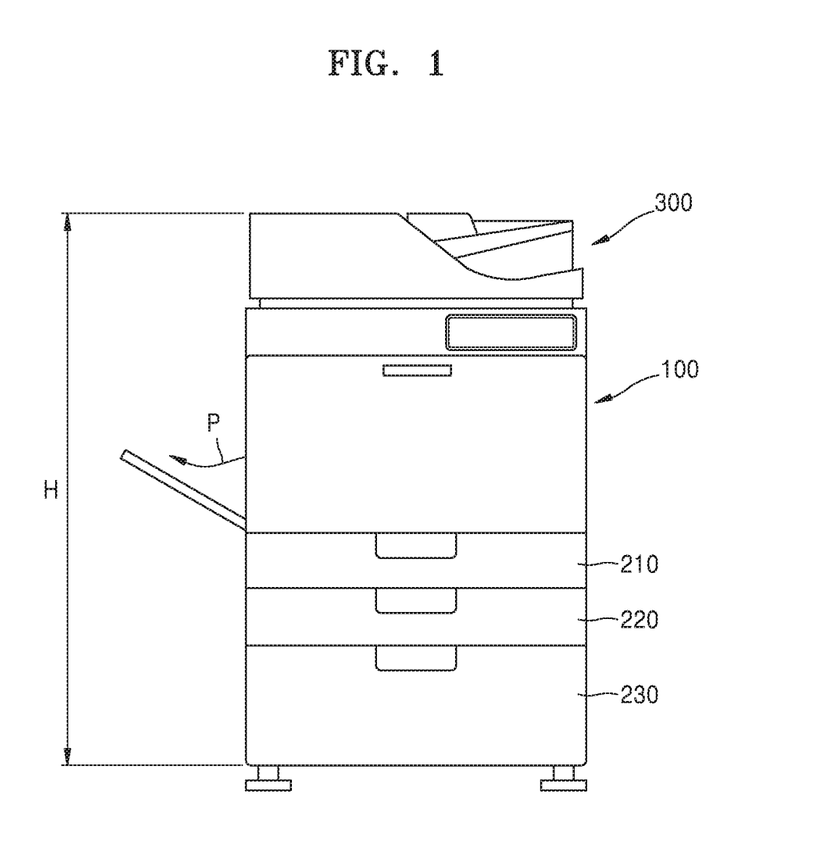
FIG. 1 is a view illustrating a configuration of an image forming apparatus according to an example.

FIG. 1 is a view illustrating a configuration of an image forming apparatus according to an example. Referring to FIG. 1, the image forming apparatus may include a printer 100 and a scanner 300. The printer 100 prints an image on a sheet-type medium (hereinafter, referred to as paper) supplied from a feeder. The feeder may include at least one of a main cassette feeder 210 provided under the printer 100, a secondary cassette feeder 220 provided under the main cassette feeder 210, and a high capacity feeder 230 provided under the main cassette feeder 210 or the secondary cassette feeder 220. Although not shown in FIG. 1, the feeder may include a multi-purpose tray.

The printer 100 may print an image on a print medium P by using any of various methods such as an electrophotography method, an inkjet method, a thermal transfer method, or a thermal sublimation method. For example, the image forming apparatus of the present example prints a color image on the print medium P by using an electrophotography method.

The scanner 300 is a combination scanner capable of flatbed scanning in which a document is located at a fixed position and a reading member moves in a sub-scanning direction to read an image and a document feed scanning in which an image is read from a document fed in a sub-scanning direction by using a reading member located at a fixed position.

Figure 2:
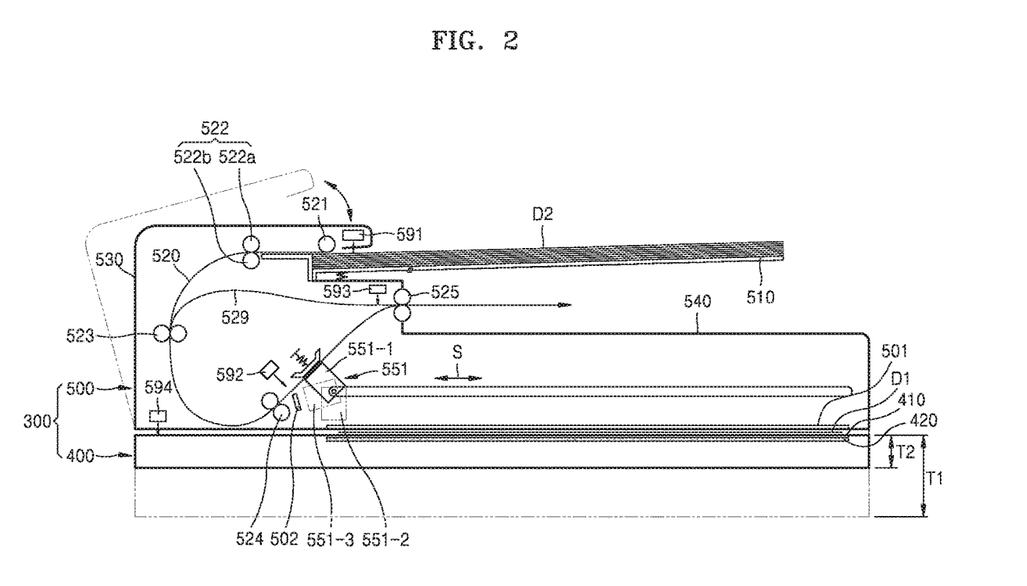
FIG. 2 is a cross-sectional view of a scanner according to an example.
Figure 3:
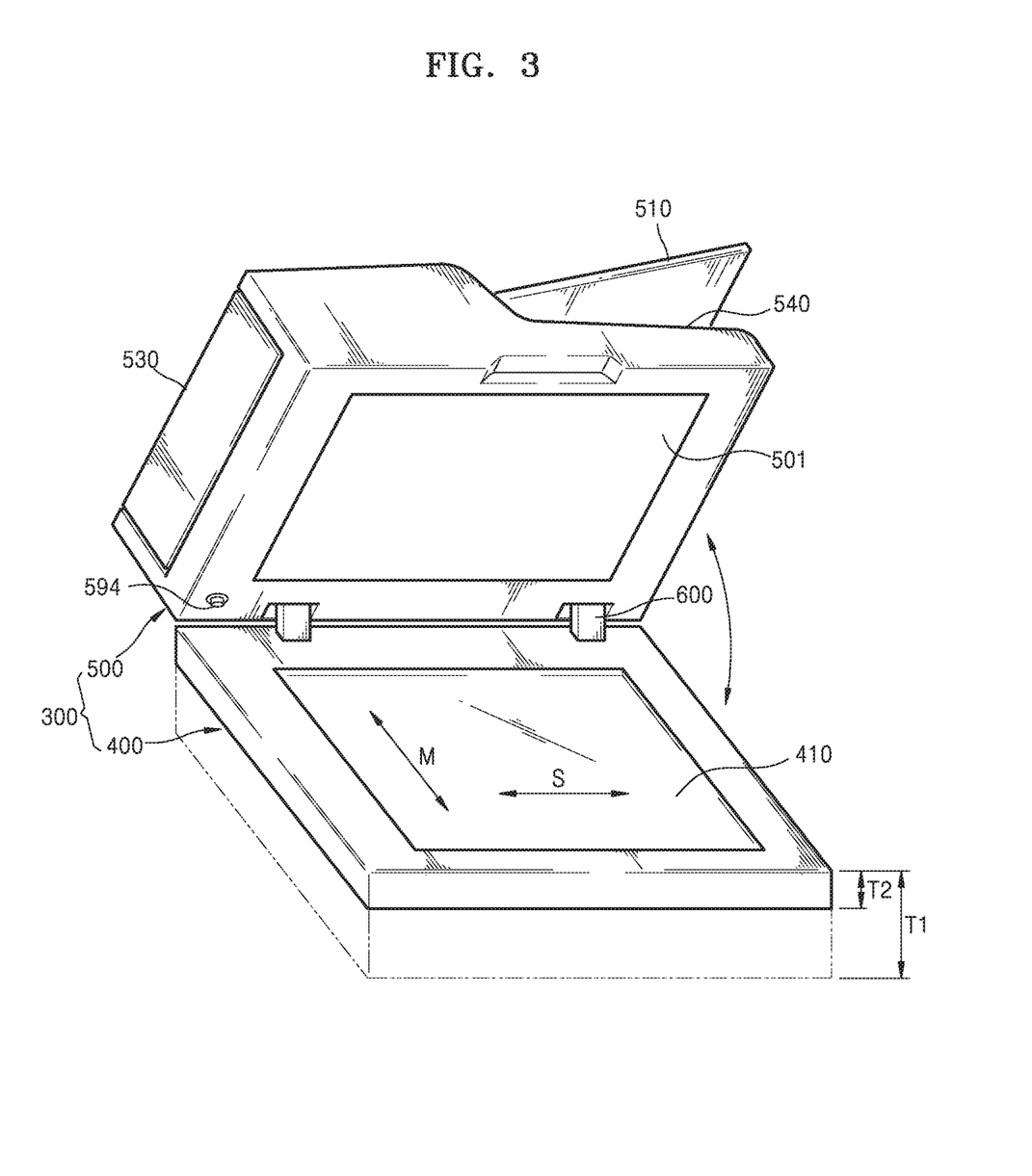
FIG. 3 is a perspective view of the scanner of FIG. 2, illustrating a state in which an upper unit is open.

FIG. 2 is a cross-sectional view of the scanner 300 according to an example. FIG. 3 is a perspective view of the scanner 300 of FIG. 2, illustrating a state in which an upper unit 500 is open. Referring to FIGS. 2 and 3, the scanner 300 includes a lower unit 400 including a first document table 410 on which a first document D1 for flatbed scanning is placed (e.g., in a face-up state) and the upper unit 500 connected to the lower unit 400 to pivot between a closed position in which the first document table 410 is covered and an open position in which the first document table 410 is exposed. The upper unit 500 includes a second document table 510 on which a second document D2 for document feed scanning is loaded and a document feed path 520 through which the second document D2 picked up from the second document table 510 is fed. The upper unit 500 includes a reading unit that reads an image from the first document D1 by performing flatbed scanning and/or the second document D2 by performing document feed scanning.

The first document table 410 is provided on a top surface of the lower unit 400 facing the upper unit 500. The upper unit 500 may include a platen glass 501 facing the first document table 410. The platen glass 501 covers the first document table 410 when the upper unit 500 is located at the closed position as shown in FIG. 2. The platen glass 501 is formed of a light-transmitting material through which light may be transmitted. The first document table 410 may be elastically supported by an elastic member 420, for example, an elastic sponge. The upper unit 500 may further include a discharge tray 540 located between the platen glass 501 and the second document table 510 and allowing the second document D2 discharged from the document feed path 520 to be loaded thereon.

A cover 530 may be opened/closed to partially open the document feed path 520. A plurality of document feed rollers for feeding a document are located on the document feed path 520. For example, a pickup roller 521 picks up the second document D2 from the second document table 510. Feed rollers 523 and 524 feed the second document D2 along the document feed path 520. A feed roller 525 is a discharge roller that discharges the second document D2 on which scanning is completed. Each of the feed rollers 523, 524, and 525 may include one pair of rollers engaged with each other and feeding the second document D2 therebetween. One of the pair of rollers may be a driving roller, and the remaining one may be a driven roller that is pressed and rotated by the driving roller.

An automatic document feeding (ADF) unit 522 that separates the second document D2 one by one may be located between the pickup roller 521 and the feed roller 523. The ADF unit 522 may include, for example, an ADF roller 522a and a retard roller 522b engaged with each other and rotating in opposite directions. The ADF roller 522a rotates in a direction in which the second document D2 is fed along the document feed path 520, and the retard roller 522b rotates in the opposite direction. When two or more documents are supplied between the ADF roller 522a and the retard roller 522b, the ADF roller 522a and the retard roller 522b may separate one document by using a frictional force difference and may supply the document to the feed roller 523. For example, when a plurality of documents are supplied between the ADF roller 522a and the retard roller 522b, a frictional force between the documents is less than a frictional force between the ADF roller 522a and the documents and a frictional force between the retard roller 522b and the documents. Accordingly, a document contacting the ADF roller 522a and another document under the document are separated from each other and the document contacting the ADF roller 522a is fed to the feed roller 523. A structure of the ADF unit 522 is not limited to that of FIG. 1, and may have any of various well-known structures. For example, a friction pad, instead of the retard roller 522b, may be used.

Referring to FIG. 2, the scanner 300 may include at least one sensor that detects the second document D2. For example, a document sensor 591 detects whether the second document D2 is placed on the second document table 510. A reading start time detection sensor 592 detects a position of the second document D2 in order to match a reading start timing of the reading unit. A discharge sensor 593 detects whether discharging of the second document D2 on which reading is completed is completed. An opening/closing sensor 594 detects whether the upper unit 500 is closed. The document sensor 591, the reading start time detection sensor 592, and the discharge sensor 593 may each include an actuator that is operated by the second document D2 and a detector that detects a position of the actuator. The detector may be, for example, a micro switch or an optical sensor such as a photo-interrupter. The opening/closing sensor 594 may include an actuator that contacts the lower unit 400 and operates when the upper unit 500 is located at the closed position and a detector (e.g., a micro switch or an optical sensor such as a photo-interrupter) that detects a position of the actuator.

As described above, the reading unit provided on the upper unit 500 may be capable of flatbed scanning and document feed scanning. In an example, referring to FIG. 2, the reading unit may include a first reading member 551. The first reading member 551 has a first position 551-1 in which the first reading member 551 reads an image from the second document D2 fed along the document feed path 520 and, a second position 551-2 in which the first reading member 551 reads an image from the first document D1 placed on the first document table 410 as the first reading member 551 moves in a sub-scanning direction S. The first reading member 551 is located over the platen glass 501 and reads an image from the first document D1 placed on the first document table 410 with the platen glass 501 therebetween.

The first reading member 551 includes a light source that emits light to a document and a photoelectric conversion device that receives light reflected from the document and converts an optical signal into an electrical signal through photoelectric conversion. A contact image sensor (CIS) or a charge-coupled device (CCD) may be used as the first reading member 551. In the present example, a CIS is used as the first reading member 551. The first reading member 551 is a one-dimensional (1D) sensor having a length in a main scanning direction M. In order to obtain two-dimensional (2D) image data, in document feed scanning, the second document D2 moves in the sub-scanning direction S along the document feed path 520 and the first reading member 551 is located at the first position 551-1 and reads an image from the second document D2, and in flatbed scanning, the first document D1 is placed on the first document table 410 and the first reading member 551 reads an image from the first document D1 while moving in the sub-scanning direction S.

The first reading member 551 may further have a waiting position 551-3 between the first position 551-1 and the second position 551-2. The first reading member 551 may be located at the waiting position 551-3 when a scanning operation is not performed. The upper unit 500 may include a shading member 502 facing the first reading member 551 located at the waiting position 551-3 and providing a shading reference. A shading pattern having a reference density that is a reference value for an image density is provided on the shading member 502. When a scan start command is input from a host (not shown) or an operation panel (not shown), a controller (not shown) controls the first reading member 551 to emit light to the shading member 502 and detect light reflected from the shading pattern. The controller obtains a reference value of the image density from an electrical signal input from the first reading member 551. Next, the controller may control the first reading member 551 to selectively perform flatbed scanning or document feed scanning.

Figure 4:
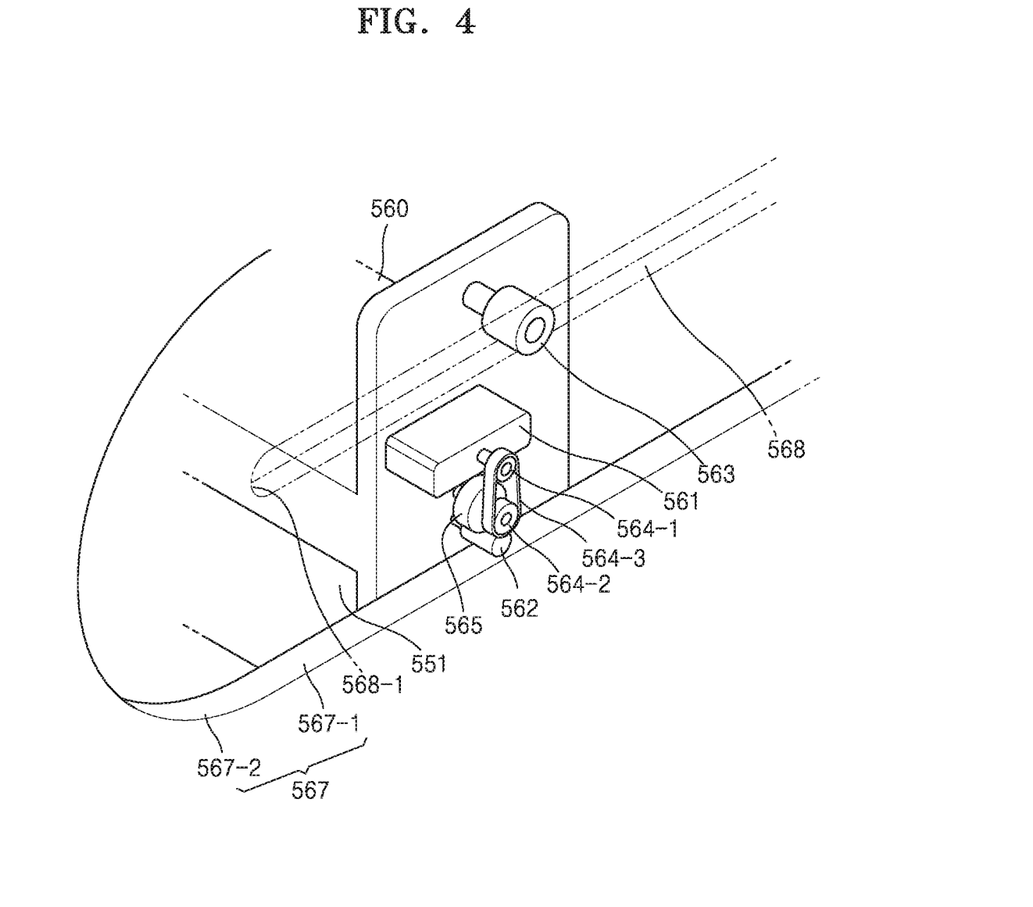
FIG. 4 is a view illustrating a structure of moving a first reading member to a first position and a second position, according to an example.

The first reading member 551 may move to the first position 551-1 and the second position 551-2 by using any of various driving structures. FIG. 4 is a view illustrating a structure of moving the first reading member 551 to the first position 551-1 and the second position 551-2 according to an example. Referring to FIG. 4, the first reading member 551 is mounted on a movable member 560. A rotary member 562 is provided at a side of the movable member 560. The rotary member 562 is supported on a guide rail 567. A driving motor 561 is mounted on the movable member 560, and rotates the rotary member 562 and moves the movable member 560 along the guide rail 567.

A power transmission member may be located between the driving motor 561 and the rotary member 562. In an example, referring to FIG. 4, a pulley 564-1 is provided on a rotation shaft of the driving motor 561. A pulley 564-2 is provided at a side of the movable member 560. A belt 564-3 is wound around the pulleys 564-1 and 564-2. The rotary member 562 receives rotation power from the pulley 564-2.

The rotary member 562 may be, for example, a roller. In this case, the pulley 564-2 may include a roller portion 565, and the roller portion 565 may frictionally contact the rotary member 562 and may rotate the rotary member 562.

The rotary member 562 may be, for example, a gear. In this case, the pulley 564-2 may include a gear portion (not shown), instead of the roller portion 565, and the gear portion may be engaged with the rotary member 562 having a gear shape and may rotate the rotary member 562. In this case, the guide rail 567 may have a rack gear shape engaged with the rotary member 562 having a gear shape.

The guide rail 567 is formed to guide the first reading member 551 to the first position 551-1 and the second position 551-2. The guide rail 567 is formed to guide the first reading member 551 to the first position 551-1, the waiting position 551-3, and the second position 551-2. For example, the guide rail 567 may include a first rail 567-1 extending in the sub-scanning direction S to correspond to the second position 551-2, and a second rail 567-2 extending from the first rail 567-1 and guiding the first reading member 551 to the waiting position 551-3 and the first position 551-1. In the present example, the first reading member 551 faces the first document table 410 at the second position 551-2, and the first reading member 551 faces the document feed path 520 at the first position 551-1. Accordingly, when the first reading member 551 is changed to the first position 551-1 and the second position 551-2, the first reading member 551 rotates as shown in FIG. 2. For example, a guide roller 563 is provided on the movable member 560. A guide slot 568 for guiding the guide roller 563 is formed in the upper unit 550. The guide slot 568 extends in the sub-scanning direction S. The guide slot 568 is parallel to the first rail 567-1. The second rail 567-2 may have an arc shape centered at an end portion 568-1 of the guide slot 568.

In this structure, at the second position 551-2, the first reading member 551 located over the platen glass 501 is guided by the first rail 567-1 and moves in the sub-scanning direction S to read an image from the first document D1 placed on the first document table 410. When the first reading member 551 moves in the sub-scanning direction S, the guide roller 563 reaches the end portion 568-1 of the guide slot 568, and then the driving motor 561 is continuously driven, the first reading member 551 may rotate around the end portion 568-1 of the guide slot 568 and may reach the waiting position 551-3 of FIG. 2. In this state, when the driving motor 561 further rotates, the first reading member 551 may further rotate around the end portion 568-1 of the guide slot 568 and may reach the first position 551-1 of FIG. 2.

A structure of moving the first reading member 551 to the first position 551-1 and the second position 551-2 is not limited to that of FIG. 4. For example, although not shown in FIG. 4, the movable member 560 on which the first reading member 551 is mounted may be supported on a wire or a timing belt that circulates in the sub-scanning direction S and may move in the sub-scanning direction S at the second position 551-2. The first reading member 551 may be connected to the movable member 560 to pivot to the waiting position 551-3 and the first position 551-1.

In this structure, the first reading member 551 may be capable of document feed scanning and flatbed scanning.

In an example of a combination scanner, a reading unit is provided on a lower unit. The reading unit moves in a sub-scanning direction in the lower unit for flatbed scanning, and moves to a predetermined position in the lower unit and is maintained in a stopped state for document feed scanning. According to the combination scanner, because a structure for driving the reading unit in the sub-scanning direction may be provided on the lower unit, a thickness T1 of the lower unit is large as marked by a dashed line in FIGS. 2 and 3. In general, when the reading unit is located on the lower unit, the thickness T1 of the lower unit ranges from about 70 mm to about 100 mm.

According to the scanner 300 of the present example, however, a reading unit is provided on the upper unit 500, instead of the lower unit 400, and thus a thickness T2 of the lower unit 400 may be less than the thickness T1 of the lower unit of the combination scanner, as marked by a solid line in FIGS. 2 and 3. For example, the thickness T2 of the lower unit 400 may be about 10 mm. Because the reading unit may be received in a space under the discharge tray 540 that is a dead space of the upper unit 500, a thickness of the upper unit 500 is hardly changed when compared to a thickness of an upper unit of the combination scanner. Accordingly, a total thickness of the scanner 300 of the present example is less than a thickness of the combination scanner.

As an example, a height of an image forming apparatus, e.g., a copy machine, including a scanner may range from about 1200 mm to about 1350 mm, which may be quite high for people in wheelchairs, thereby making it difficult for people in wheelchairs to use the image forming apparatus. In the United States, it is recommended that a height of a copy machine range from about 914 mm to about 1118 mm in order to eliminate the difficulty of use by people in wheelchairs, and when a height of a copy machine is greater than the range, a handle for helping to perform an operation be additionally provided.

When the scanner 300 having a small thickness of the present example is coupled to the top of the printer 100 to form an image forming apparatus such as a copy machine or a multi-function printer as shown in FIG. 1, a total height H of the image forming apparatus may be reduced. Accordingly, use convenience of people in wheelchairs may be improved. Also, because sizes of the scanner 300 and the image forming apparatus employing the scanner 300 are reduced, component costs, packaging costs, and transportation costs may be reduced.

An operation of the scanner 300 having the configuration will now be described.

When a scanning operation is not performed, the first reading member 551 may be located at the waiting position 551-3.

When a scan command is input through the host (not shown) or the operation panel (not shown), the controller (not shown) determines whether to perform document feed scanning or flatbed scanning. For example, the controller may control the scanner 300 to perform document feed scanning or flatbed scanning according to an output signal of the document sensor 591 and an output signal of the opening/closing sensor 594.

When the document sensor 591 detects that the second document D2 is placed on the second document table 510, the controller controls the scanner 300 to perform document feed scanning. The second document D2 is placed on the second document table 510 in a face-up state. The controller moves the first reading member 551 located at the waiting position 551-3 to the first position 551-1 by driving the driving motor 561, for example, in a forward direction. When the first reading member 551 reaches the first position 551-1, the controller feeds the second document D2 along the document feed path 520 by driving the pickup roller 521, the ADF unit 522, and the feed rollers 523, 524, and 525. When the second document D2 is detected by the reading start time detection sensor 592, the controller controls the first reading member 551 to start reading in accordance with a reading start timing. The second document D2 on which scanning is completed is discharged to the discharge tray 540 by the feed roller 525. The controller may determine whether discharging of the second document D2 is completed and may stop driving of the rollers from an output signal of the discharge sensor 593.

When the document sensor 591 does not detect that the second document D2 is placed on the second document table 510 and the closed state of the upper unit 500 is detected by the opening/closing sensor 594, the controller may control the scanner 300 to perform flatbed scanning. The first document D1 is placed on the first document table 410 in a face-up state. The controller moves the first reading member 551 located at the waiting position 551-3 to the second position 551-2 by driving the driving motor 561, for example, a reverse direction. The first reading member 551 located over the platen glass 501 faces the first document D1 placed on the first document table 410. The controller controls the scanner 300 to read an image from the first document D1 by moving the first reading member 551 in the sub-scanning direction S. A moving distance or a position of the first reading member 551 in the sub-scanning direction S may be determined by a driving time of the driving motor 561, the number of driving pulses, and so on. Although not shown, at least one sensor for detecting a position of the first reading member 551 may be provided on the upper unit 500.

The scanner 300 may read an image from a surface (e.g., a first surface) of the second document D2 by using document feed scanning. For duplex scanning, various methods may be used.

For example, as shown in FIG. 2, the upper unit 500 may further include an inversion path 529 for inverting the second document D2 on the first surface of which scanning by the first reading member 551 is completed so that a second surface faces the first reading member 551 and then guiding the inverted second document D2 to the document feed path 520. The inversion path 529 may extend from, for example, the feed roller 525 that is a discharge roller, and may be connected to the document feed path 520 at the upstream of the feed roller 523.

When simplex scanning is selected, the controller discharges the second document D2 to the discharge tray 540 by driving the feed roller 525 in a forward direction during a predetermined period of time after an end of the second document D2 on the first surface of which scanning by the first reading member 551 is completed is detected by the discharge sensor 593.

When duplex scanning is selected, when an end of the second document D2 on the first surface of which scanning by the first reading member 551 is completed is detected by the discharge sensor 593, the controller rotates the feed roller 525 in a reverse direction and feeds the second document D2 along the inversion path 529. In this process, the second document D2 is inverted so that the second surface of the second document D2 faces the first reading member 551. When a front end of the inverted second document D2 is caught by the feed roller 523, the feed roller 525 rotates in the forward direction. The inverted second document D2 is fed along the document feed path 520, and the first reading member 551 reads an image from the second surface of the second document D2. The second document D2 on which duplex scanning is completed is discharged to the discharge tray 540.

In this structure, the scanner 300 including a reading unit that performs document feed scanning and flatbed scanning and capable of duplex scanning of the second document D2 may be realized.

Figure 5:
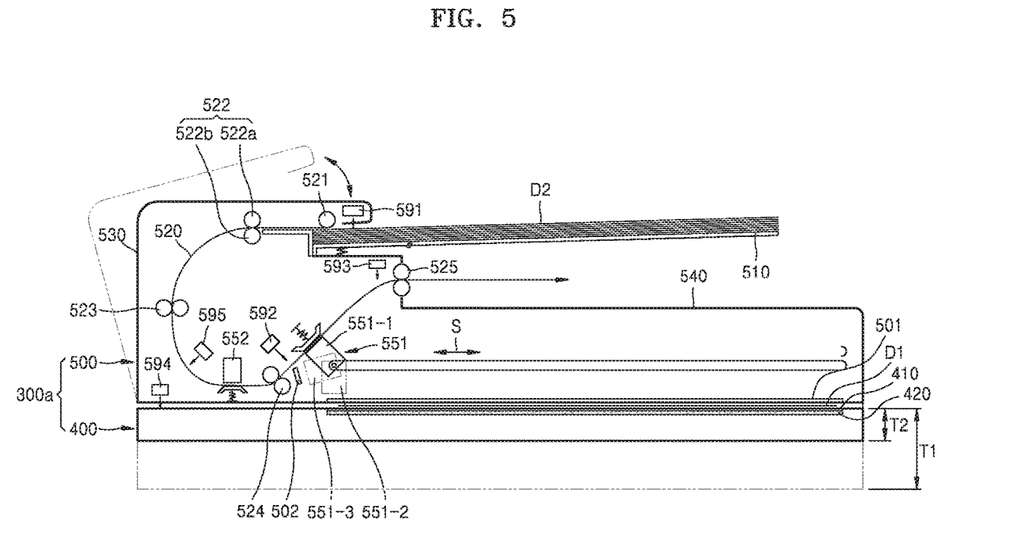
FIG. 5 is a cross-sectional view of a scanner according to an example.

FIG. 5 is a cross-sectional view of a scanner 300*a* according to an example. Referring to FIG. 5, the scanner 300*a* of FIG. 5 is different from the scanner 300 of FIG. 2 in that a second reading member 552 that reads an image from the second surface of the second document D2 fed along the document feed path 520 is provided on the upper unit 500. The inversion path 529 is a non-limiting example of a path.

A reading unit includes the first reading member 551 and the second reading member 552. The first reading member 551 located over the platen glass 501 has the first position 551-1 where an image is read from the first surface of the second document D2 fed along the document feed path 520 and the second position 551-2 where an image is read from the first document D1 placed on the first document table 410 as the first reading member 551 moves in the sub-scanning direction S. The first reading member 551 may further include the waiting position 551-3 between the first position 551-1 and the second position 551-2. A structure of moving the first reading member 551 to the first position 551-1 and the second position 551-2 may be the same as that described with reference to FIG. 4.

The second reading member 552 may include a light source that emits light to a document and a photoelectric conversion device that receives light reflected from the document and converts an optical signal into an electrical signal through photoelectric conversion, and a CIS or a CCD may be used as the second reading member 552. In the present example, a CIS is used as the second reading member 552. The second reading member 552 is a 1D sensor having a length in the main scanning direction M.

The second reading member 552 may be located at the upstream of the first reading member 551 located at the first position 551-1 so that the second reading member 552 and the first reading member 551 are located at opposite sides of the document feed path 520. In order to match a reading start timing of the second reading member 552, the sensor 595 that detects a position of the second document D2 may be provided at the upstream of the second reading member 552.

Document feed scanning and flatbed scanning of the scanner 300*a* and simplex and duplex scanning operations of the second document D2 will now be described.

When a scanning operation is not performed, the first reading member 551 may be located at the waiting position 551-3. When a scan command is input through the host (not shown) or the operation panel (not shown), the controller determines whether to perform document feed scanning or flatbed scanning. For example, the controller may control the scanner 300*a* to perform document feed scanning or flatbed scanning according to an output signal of the document sensor 591 and an output signal of the opening/closing sensor 594.

When the document sensor 591 detects that the second document D2 is placed on the second document table 510, the controller controls the scanner 300*a* to perform document feed scanning. The second document D2 is placed on the second document table 510 in a face-up state. The controller moves the first reading member 551 located at the waiting position 551-3 to the first position 551-1 by driving the driving motor 561, for example, a forward direction. In this case, when the first reading member 551 reaches the first position 551-1, the controller feeds the second document D2 along the document feed path 520 by driving the pickup roller 521, the ADF unit 522, and the feed rollers 523, 524, and 525. Assuming that simplex scanning is selected, when the second document D2 is detected by the reading start time detection sensor 592, the controller controls the first reading member 551 to start reading an image from the first surface of the second document D2 in accordance with a reading start timing. The second document D2 on which simplex scanning is completed is discharged to the discharge tray 540 by the feed roller 525. The controller may determine whether discharging of the second document D2 is completed and may stop driving of the rollers from an output signal of the discharge sensor 593.

Assuming that duplex scanning is selected, when the second document D2 is detected by the sensor 595, the controller controls the second reading member 552 to start reading an image from the second surface of the second document D2 in accordance with a reading start timing. When the second document D2 is detected by the reading start time detection sensor 592, the controller controls the first reading member 551 to start reading an image from the first surface of the second document D2 in accordance with a reading start timing. The second document D2 on which duplex scanning is completed is discharged to the discharge tray 540 by the feed roller 525. The controller may determine whether discharging of the second document D2 is completed and may stop driving of the rollers from an output signal of the discharge sensor 593.

When the document sensor 591 does not detect that the second document D2 is placed on the second document table 510 and the closed state of the upper unit 500 is detected by the opening/closing sensor 594, the controller controls the scanner 300a to perform flatbed scanning. A flatbed scanning process of the scanner 300a is the same as that of the scanner 300, and thus a detailed explanation thereof will not be given.

As such, the scanner 300a including a reading unit that performs document feed scanning and flatbed scanning and capable of duplex scanning of the second document D2 may be realized.

Figure 6:
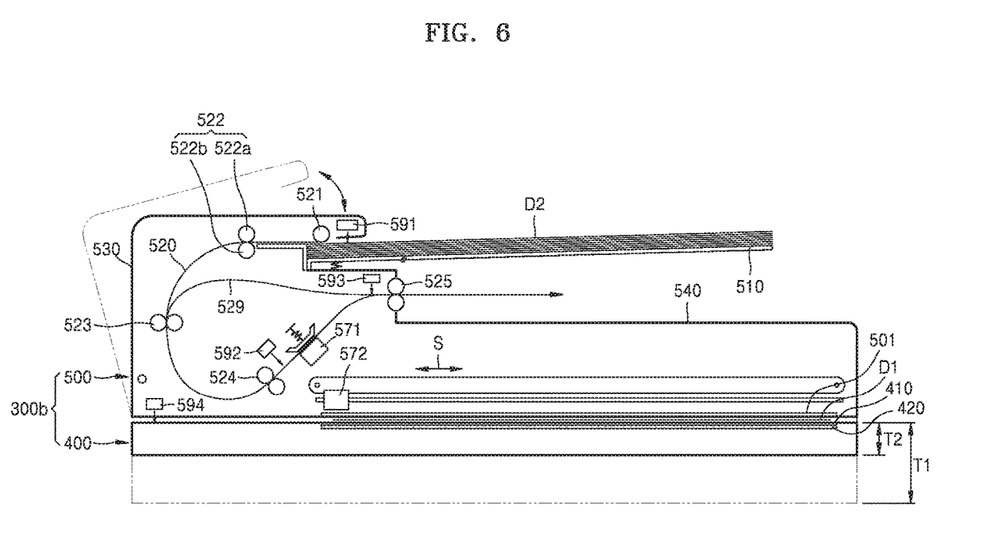
FIG. 6 is a cross-sectional view of a scanner according to an example.

FIG. 6 is a cross-sectional view of a scanner 300b according to an example. The scanner 300b of FIG. 6 is different from the scanner 300 of FIG. 2 in that an additional reading member for document feed scanning and flatbed scanning is employed. Referring to FIG. 6, a reading unit includes a fixed reading member 571 that reads an image from the second document D2 fed along the document feed path 520 and a movable reading member 572 that reads an image from the first document D1 placed on the first document table 410 while moving in the sub-scanning direction S.

The fixed reading member 571 and the movable reading member 572 may each include a light source that emits light to a document and a photoelectric conversion device that receives light reflected from the document and converts an optical signal into an electrical signal through photoelectric conversion, and a CIS or a CCD may be used as each of the fixed reading member 571 and the movable reading member 572. In the present example, a CIS is used as each of the fixed reading member 571 and the movable reading member 572. Each of the fixed reading member 571 and the movable reading member 572 is a 1D sensor having a length in the main scanning direction M.

The fixed reading member 571 is located at a fixed position to face the second document D2 fed along the document feed path 520. There are various methods of moving the movable reading member 572 in the sub-scanning direction S. For example, the movable reading member 572 may be supported on a guide member, for example, a guide shaft, extending in the sub-scanning direction S. The movable reading member 572 may be connected to a wire supported on a plurality of pulleys and reciprocating in the sub-scanning direction S. The movable reading member 572 may be moved in the sub-scanning direction S by rotating the pulleys and traveling the wire in the sub-scanning direction S. A timing pulley and a timing belt, instead of the pulleys and the wire, may be used.

An operation of the scanner 300b having the configuration will now be described.

When a scan command is input through the host (not shown) or the operation panel (not shown), the controller determines whether to perform document feed scanning or flatbed scanning. For example, the controller may control the scanner 300b to perform document feed scanning or flatbed scanning according to an output signal of the document sensor 591 and an output signal of the opening/closing sensor 594.

When the document sensor 591 detects that the second document D2 is placed on the second document table 510, the controller controls the scanner 300b to perform document feed scanning. The second document D2 is placed on the second document table 510 in a face-up state. The controller feeds the second document D2 along the document feed path 520 by driving the pickup roller 521, the ADF unit 522, and the feed rollers 523, 524, and 525. When the second document D2 is detected by the reading start time detection sensor 592, the controller controls the fixed reading member 571 to start reading in accordance with a reading start timing. The second document D2 on which scanning is completed is discharged to the discharge tray 540 by the feed roller 525. The controller may determine whether discharging of the second document D2 is completed and may stop driving of the rollers from an output signal of the discharge sensor 593.

When the document sensor 591 does not detect that the second document D2 is placed on the second document table 510 and the closed state of the upper unit 500 is detected by the opening/closing sensor 594, the controller controls the scanner 300b to perform flatbed scanning. The first document D1 is placed on the first document table 410 in a face-up state. The controller controls the scanner 300b to read an image from the first document D1 by moving the movable reading member 572 in the sub-scanning direction S. A moving distance or a position of the movable reading member 572 in the sub-scanning direction S may be detected by a driving time of a driving motor that drives a wire or a timing belt, the number of driving pulses, and so on. Although not shown in FIG. 6, at least one sensor that detects a position of the movable reading member 572 may be provided on the upper unit 500.

As such, the scanner 300b including a reading unit that performs document feed scanning and flatbed scanning may be realized.

The scanner 300b may read an image from a surface (e.g., the first surface) of the second document D2 by using document feed scanning.

There may be various structures for duplex scanning. For example, as shown in FIG. 6, the fixed reading member 571 reads an image from the first surface of the second document D2. The upper unit 500 may further include the inversion path 529 for inverting the second document D2 on the first surface of which scanning by the fixed reading member 571 is completed so that the second surface faces the fixed reading member 571 and then guiding the inverted second document D2 to the document feed path 520. The inversion path 529 may extend from, for example, the feed roller 525, and may be connected to the document feed path 520 at the upstream of the feed roller 523.

When simplex scanning is selected, the controller discharges the second document D2 to the discharge tray 540 by driving the feed roller 525 in a forward direction during a predetermined period of time after an end of the second document D2 on the first surface of which scanning by the fixed reading member 571 is completed is detected by the discharge sensor 593.

When duplex scanning is selected, when an end of the second document D2 on the first surface of which scanning by the fixed reading member 571 is completed is detected by the discharge sensor 593, the controller may rotate the feed roller 525 in a reverse direction and may feed the second document D2 along the inversion path 529. In this process, the second document D2 is inverted so that the second surface of the second document D2 faces the fixed reading member 571. When a front end of the inverted second document D2 is caught by the feed roller 523, the feed roller 525 rotates in the forward direction. When the inverted second document D2 is fed along the document feed path 520, the fixed reading member 571 reads an image from the second surface of the second document D2. The second document D2 on which duplex scanning is completed is discharged to the discharge tray 540.

As such, the scanner 300*b* including a reading unit that performs document feed scanning and flatbed scanning and capable of duplex scanning of the second document D2 may be realized.

While the disclosure has been particularly shown and described with reference to examples thereof, they are provided for illustration and it will be understood by one of ordinary skill in the art that various modifications and equivalent other examples can be made from the present disclosure. Accordingly, the true technical scope of the disclosure is defined by the technical spirit of the appended claims.

What is claimed is:

1. A scanner comprising:
    a lower unit comprising a first document table on which a first document is to be placed; and
    an upper unit comprising
        a platen glass facing the first document table,
        a second document table on which a second document is to be loaded and a document feed path through which the second document to be picked up from the second document table is fed, the upper unit being coupled to the lower unit to pivot between a closed position in which the first document table is covered and an open position in which the first document table is exposed, and
        a reading unit to perform at least one reading operation from among reading operations to read an image from the first document by performing flatbed scanning on the first document, and read an image from the second document by performing document feed scanning on the second document, wherein the reading unit is to read the image from the first document placed on the first document table with the platen glass between the reading unit and the first document.

2. The scanner of claim 1, wherein
the upper unit further comprises:
    a discharge tray located between the platen glass and the second document table to allow the second document discharged from the document feed path to be loaded on the discharge tray.

3. The scanner of claim 1, wherein the reading unit comprises a first reading member located over a platen glass to move to a first position where the first reading member is to read an image from the second document fed along the document feed path and, to move to a second position where the first reading member is to read an image from the first document placed on the first document table as the first reading member moves in a sub-scanning direction.

4. The scanner of claim 3, wherein the upper unit further comprises an inversion path to invert the second document on a first surface of which scanning by the first reading member is completed so that a second surface of the second document faces the first reading member and to then guide the inverted second document to the document feed path.

5. The scanner of claim 3, wherein the first reading member is to read an image from a first surface of the second document,
    wherein the reading unit further comprises a second reading member to read an image from a second surface of the second document fed along the document feed path.

6. The scanner of claim 3, wherein the upper unit further comprises:
    a movable member on which the first reading member is mounted;
    a guide rail to guide the first reading member to the first position and the second position;
    a rotary member provided at a side of the movable member and supported by the guide rail; and
    a driving motor mounted on the movable member and to rotate the rotary member to move the movable member along the guide rail.

7. The scanner of claim 1, wherein the reading unit comprises:
    a fixed reading member to read an image from the second document fed along the document feed path; and
    a movable reading member to read an image from the first document placed on the first document table while moving in a sub-scanning direction.

8. The scanner of claim 7, wherein the upper unit further comprises an inversion path to invert the second document on a first surface of which scanning by the fixed reading member is completed so that a second surface of the second document faces the fixed reading member and to then guide the inverted second document to the document feed path.

9. An image forming apparatus comprising:
    a printer to form an image on a print medium; and
    a scanner located on the printer and to read an image from a document,
    wherein the scanner comprises:
        a lower unit comprising a first document table on which a first document is to be placed; and
        an upper unit comprising
            a platen glass facing the first document table,
            a second document table on which a second document is to be loaded and a document feed path through which the second document is to be picked up from the second document table is fed, the upper unit being coupled to the lower unit to pivot between a closed position in which the first document table is covered and an open position in which the first document table is exposed, and
            a reading unit to perform at least one reading operation from among reading operations to read an image from the first document by performing flatbed scanning on the first document, and read an image from the second document by performing document feed scanning on the second document, wherein the reading unit is to read the image from the first document placed on the first document table with the platen glass between the reading unit and the first document.

10. The image forming apparatus of claim 9, wherein the upper unit further comprises:

a discharge tray located between the platen glass and the second document table and to allow the second document discharged from the document feed path to be loaded on the discharge tray.

11. The image forming apparatus of claim 9, wherein the reading unit comprises a first reading member located over a platen glass to move to a first position where the first reading member is to read an image from the second document fed along the document feed path and, to move to a second position where the first reading member is to read an image from the first document placed on the first document table as the first reading member moves in a sub-scanning direction.

12. The image forming apparatus of claim 11, wherein the upper unit further comprises an inversion path to invert the second document on a first surface of which scanning by the first reading member is completed so that a second surface of the second document faces the first reading member and to then guide the inverted second document to the document feed path.

13. The image forming apparatus of claim 11, wherein the first reading member is to read an image from a first surface of the second document,
wherein the reading unit further comprises a second reading member to read an image from a second surface of the second document fed along the document feed path.

14. The image forming apparatus of claim 11, wherein the upper unit further comprises:
a movable member on which the first reading member is mounted;
a guide rail to guide the first reading member to the first position and the second position;
a rotary member provided at a side of the movable member and supported by the guide rail; and
a driving motor mounted on the movable member and to rotate the rotary member to move the movable member along the guide rail.

15. The image forming apparatus of claim 9, wherein the reading unit comprises:
a fixed reading member to read an image from the second document fed along the document feed path; and
a movable reading member to read an image from the first document placed on the first document table while moving in a sub-scanning direction.

16. The image forming apparatus of claim 15, wherein the upper unit further comprises an inversion path to invert the second document on a first surface of which scanning by the fixed reading member is completed so that a second surface of the second document faces the fixed reading member and to then guide the inverted second document to the document feed path.

* * * * *